United States Patent [19]

Ensign et al.

[11] Patent Number: 4,496,845
[45] Date of Patent: Jan. 29, 1985

[54] METHOD AND APPARATUS FOR CONTROL OF A TURBINE GENERATOR

[75] Inventors: Harold W. Ensign, Fullerton; Donald G. Griswold, Corona del Mar, both of Calif.

[73] Assignee: CLA-VAL Co., Costa Mesa, Calif.

[21] Appl. No.: 453,453

[22] Filed: Dec. 27, 1982

[51] Int. Cl.³ ............................................. F03B 13/00
[52] U.S. Cl. ........................................ 290/43; 290/54
[58] Field of Search ............................ 290/43, 52, 54

[56] References Cited

U.S. PATENT DOCUMENTS

| | | | |
|---|---|---|---|
| 2,436,683 | 2/1948 | Wood, Jr. | 290/54 X |
| 3,051,186 | 8/1962 | Fisch et al. | 137/25 |
| 3,056,036 | 9/1962 | Gardner | 290/4 |
| 3,750,001 | 7/1973 | McCloskey | 320/61 |
| 3,796,051 | 3/1974 | Kuwabara | 60/398 |
| 3,957,395 | 5/1976 | Ensign | 417/12 |
| 4,109,160 | 8/1978 | Goto et al. | 290/52 |
| 4,122,381 | 10/1978 | Sturm | 290/52 X |
| 4,176,283 | 11/1979 | McLaren | 290/52 |
| 4,352,025 | 9/1982 | Troyen | 290/54 |
| 4,369,373 | 1/1983 | Wiseman | 290/43 X |

Primary Examiner—J. V. Truhe
Assistant Examiner—W. E. Duncanson, Jr.
Attorney, Agent, or Firm—Gausewitz, Carr, Rothenberg & Edwards

[57] ABSTRACT

A turbine generator system for use in a flow line from a water supply to a water usage, treatment or storage system employs a remotely controlled valve for control of the flow of water through the turbine. The system is arranged to shut down upon occurrence of under or over voltage at the generator or loss of pressure at the turbine, disconnecting the generator from the utility line and closing the control valve to stop flow through the turbine. Should failure of the utility line power decrease the generator load to increase turbine speed, restart is prevented until the control valve has closed to stop the turbine. A time delay in the control panel shuts down the system if the control valve does not open within a selected time interval after start up. To accomodate daily variation of flow rate to a water distribution and usage system, a first turbine generator and control valve have a capacity to handle a minimum flow rate and a second turbine generator and control valve, in parallel with the first, automatically come into operation when the flow rate exceeds the capacity of the first turbine generator and control valve.

23 Claims, 5 Drawing Figures

METHOD AND APPARATUS FOR CONTROL OF A TURBINE GENERATOR

BACKGROUND OF THE INVENTION

Flowing water is one of the oldest sources of power for a mechanical device. With the early development and increased use of electricity, water power was an obvious choice for a power source and large numbers of relatively small hydro-electric generators were widely used for many years. As cheap fuels became available, and electric power distribution systems increased in size, fewer small size hydro-electric generators were employed, and many of these were abandoned. However, as alternate power sources, and especially oil and gas, became increasingly expensive, and with the advent of government regulations requiring large power generating utilities to purchase excess electric power of small generating systems, it becomes ever more practical and economically feasible to utilize the large quantities of presently wasted water power for generation of electricity by relatively small scale systems.

Small hydro-electric generating systems are now feasible and economically desirable for a great many applications. A penstock supplying water from one reservoir to another can have a system installed. Various long-distance transport lines frequently involve water flow suitable for a hydro-electric generation. In large scale water distribution systems, as where a single water district collects water from a number of sources and distributes the water to many different cities or locations in a metropolitan area, it is common to employ a pressure reducing station to drop the relatively high pressure from the water district supply lines to a lower pressure at individual user cities or areas. A typical pressure reducing station simply creates a drop in the water pressure, entirely wasting the energy of the pressure difference. Such pressure reducing stations accordingly are prime candidates for application of small scale hydro-electric power generation, particularly since the surplus electricity of a small scale generator can readily be sold to a local electric power company.

In situations where the water employed for electricity generation is fed to a user system, the flow rate will vary widely on a daily basis as use by individual industries and households varies. Turbine efficiency varies with flow rate and in many situations the daily variation of flow rate of the user system may be too great to enable a single turbine generator to operate near maximum efficiency while making maximum use of the energy of the water flow.

Other problems exist in small hydro-electric systems. Where the generator is connected to a power grid, a failure in such grid may decrease the load on the generator to the point where turbine speed increases excessively. Excessive turbine speed significantly increases the flow resistance whereby flow rate through the turbine will be decreased. Accordingly, upon such power failure, the turbine generator system must be shut down. After initiation of shut down, the turbine speed continues at an excessive rate for a short period of time, until the control valve closes. Thus, it is not desirable to restart the system until the control valve has closed and the turbine speed has descreased significantly.

Where the generator of the turbine generator system is of the synchronous type, and the generated electricity is to be supplied to a power grid, the turbine generator must be brought up to a predetermined speed and the generator output must have a closely controlled phase and frequency, matching that of the power grid system, before it can be switched into the power system. Accordingly, controls for such a synchronous generator are quite complex. An induction type generator on the other hand does not require local phase and frequency control but requires a source of excitation.

Accordingly, it is an object of the present invention to provide a control for a turbine generator system that avoids or minimizes above-mentioned problems.

SUMMARY OF THE INVENTION

In carrying out principles of the present invention in accordance with a preferred embodiment thereof, a turbine is connected in a flow path across a pressure reducer valve and a generator is connected to be driven by the turbine. A control valve operable between closed and open positions is provided to control flow through the turbine, and contactors are provided to couple the generator to a power circuit. Starting means for operating the contactors to closed condition and for initiating operation of the control valve to open position, are disabled, according to a feature of the invention, when the control valve is in the open position. According to another feature of the invention, the control panel is sensitive to water pressure so as to shut down the turbine generator when the pressure decreases to a selected minimum. According to another feature of the invention, a time delay is provided to disable the turbine generator control circuit so as to shut down the system unless the control valve opens within a selected time interval after receipt of a start command.

According to still another feature of the invention, the turbine and generator of the turbine generator system are chosen for optimum size and efficiency at a predetermined minimum flow in a flow path that has a varying flow rate. A second turbine generator system is provided in a flow path parallel to the first flow path and arranged to automatically begin operation when flow rate of the first path exceeds a selected minimum value.

DETAILED DESCRIPTION

Figure 1:
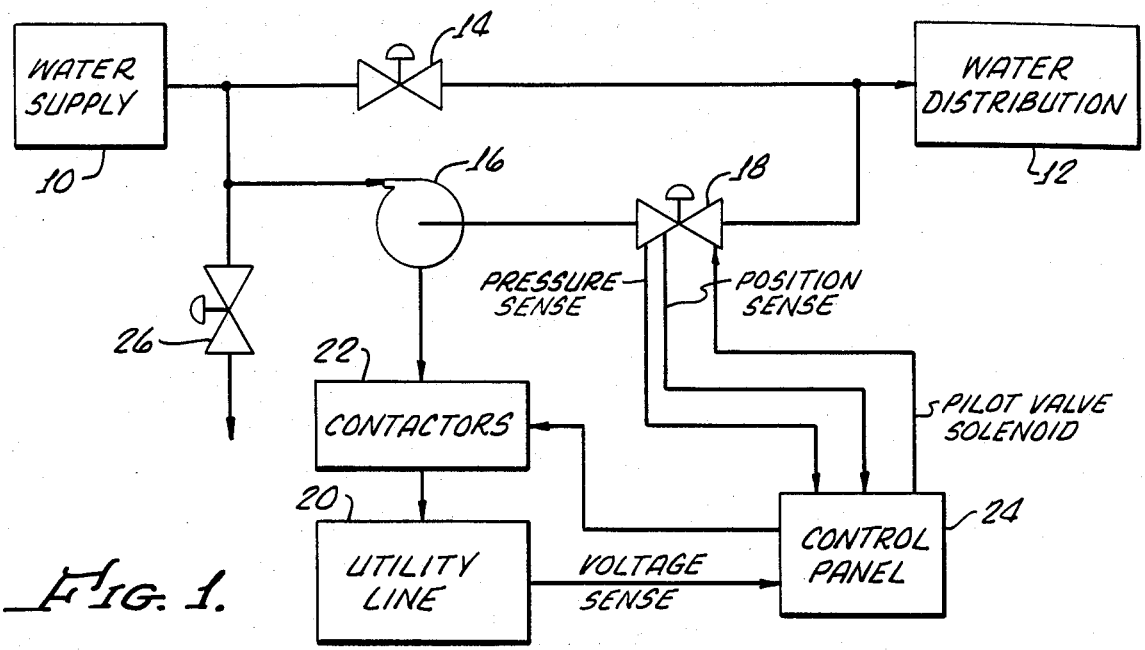
FIG. 1 illustrates a water supply system having a turbine generator and control circuit embodying principles of the present invention.

As illustrated in FIG. 1, a water supply 10, such as a water reservoir, feeds a water distribution system 12, which may be a temporary storage reservoir, a treatment plant, or a water user network comprising industrial facilities and residences. To decrease the high pressure of the water at the supply 10 to a level acceptable to the distribution system 12, a pressure reducing station including a pressure reduction valve 14, is employed. The reducing station, including valve 14, absorbs high differential pressures and large flow rates across the valve, thus absorbing a large amount of energy which normally is completely wasted. To utilize this wasted energy, there is provided a flow path connected in parallel across the reducing valve 14, and including a turbine generator 16, and a control valve 18. The turbine generator and the control valve each may be any one of a number of types readily available and well known to those skilled in the art. For example, the turbine generator may be an induction motor-driven pump commonly used for pumping water under the power of electrical energy supplied to the induction motor. Such apparatus may be readily operated as a generator by flowing water through the pump turbine to rotate the latter and thereby drive the motor as a generator.

A three phase induction motor, when connected for operation in its normal manner, may be driven above its synchronous speed so that the motor is traveling faster than the revolving magnetic field, whereby the motor will act as a generator and supply power to the line. When operated in this way the common induction motor can be referred to as an induction generator. Such a generator need not be synchronized and requires no separate excitation, merely obtaining excitation from the power supply system to which it is connected and to which it will supply power when driven above its synchronous speed. Accordingly, when the water supply pressure and flow rate are sufficient to drive the turbine and generator above synchronous speed, power is generated by and supplied from the generator. Whenever water supply decreases to a point where the turbine no longer drives the generator above its synchronous speed, the motor generator will operate as a motor and may draw power from the grid to which it is connected.

A remote control valve of the type illustrated in U.S. Pat. No. 3,957,395, may be employed for the valve 14. A valve of this general type is manufactured by Cla-Val Co., the assignee of the present invention and identified as the globe valve 100-01, for example. Such a valve includes a solenoid operated pilot valve for remotely controlling opening and closing of the valve.

The control valve includes arrangements to achieve slow opening and closing of the valve for elimination of surges. The valve also has an actuator on its movable valve stem to operate a microswitch and provide electrical signals indicating that the valve has nearly attained its open position or nearly attained its closing position.

Obviously other types of motor generators and valves may be employed. Various types of reaction type turbines or reverse running pumps, including centrifugal pumps operating in reverse as readily available in many different sizes. Centrifugal pumps are less complex and available in a larger range of configurations and sizes than conventional hydraulic turbines.

The motor generator is connected to an electric power grid system or utility line 20, via a set of switches or contactors 22 forming part of the electrical circuit of a control panel 24. The control panel includes the circuitry and relays required for starting, stopping, and maintaining operation of the motor generator and control valve assembly as will be described in further detail in connection with the description of FIG. 2.

A relief valve 26 is provided at the inlet of the turbine to prevent the turbine from being overloaded by excessive flow rate or pressure. Valve 26 is set to open when the pressure at the input of the turbine generator 16 exceeds a selected maximum pressure and may discharge to waste or may by-pass the turbine.

The control panel receives an electrical pressure signal from a pressure detector at the input of the control valve and a valve position signal from a switch on the control valve that is operated by the valve system. The control panel circuitry sends out electrical command signals that operate the solenoid of the pilot valve of the control valve, and also controls the contactor relay coil that operates the main power contactors 22. High and low voltage of the utility line is sensed to provide further inputs to the control circuitry.

Figure 2:
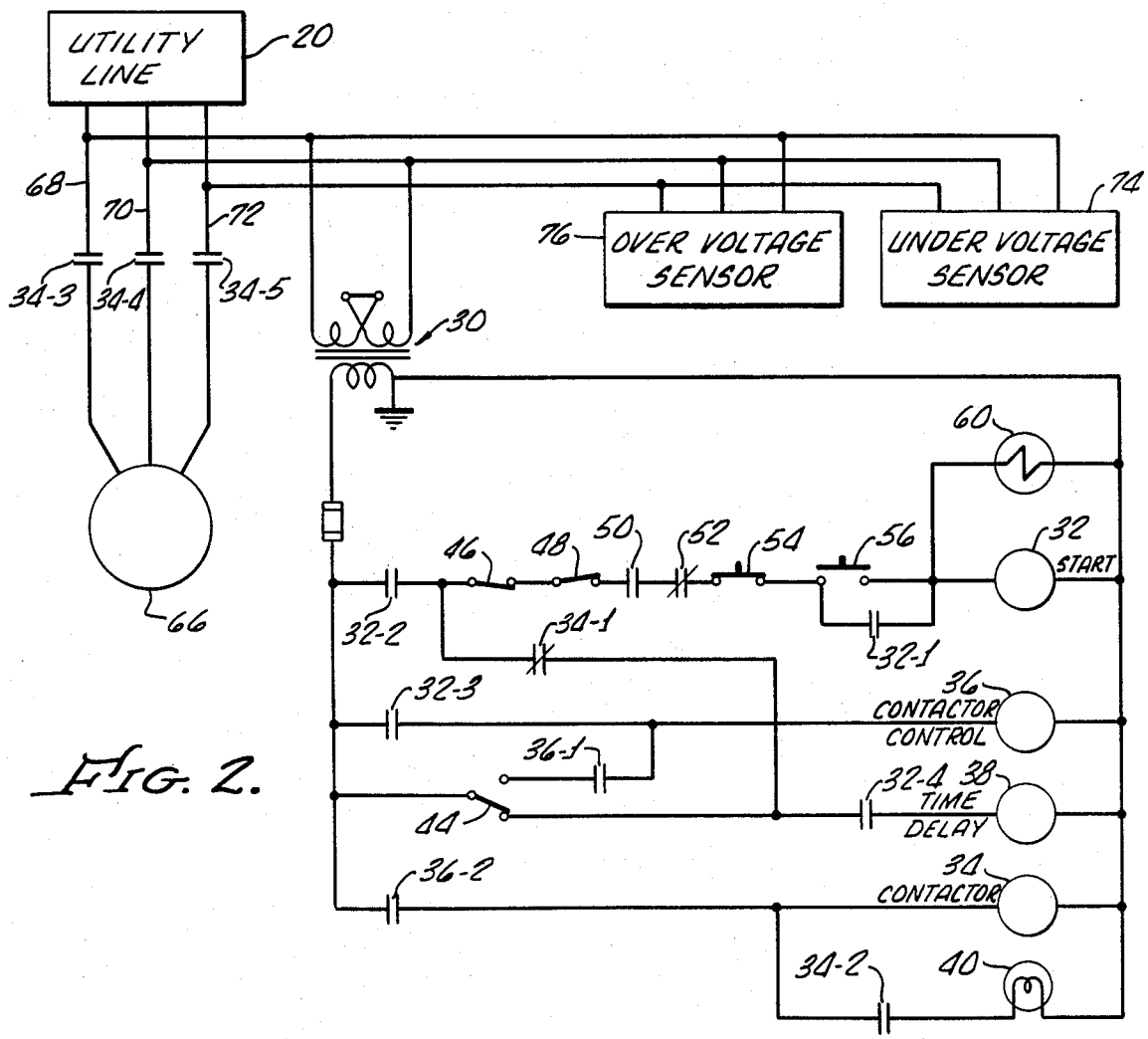
FIG. 2 is a circuit diagram of a control circuit for the turbine generator of FIG. 1.

Illustrated in FIG. 2, is a circuit diagram of the control panel of the system of FIG. 1. Power from the three phase utility lines 20 is fed via a transformer 30 to provide electrical energy for the control panel circuits. The control panel circuits include several relays, each having a coil and a number of contacts operated thereby, including a start relay coil 32, a contactor relay coil 34, a contactor relay control coil 36, a time delay coil 38, and a running indicator light 40. Power from the secondary winding of transformer 30 is fed to energize the start relay coil 32 via a start circuit that includes a valve microswitch 44, in its illustrated valve closed position, a normally closed set of relay contacts 34-1, a pressure actuated switch 46 (operated by a pressure sensor at the control valve), a time delay switch 48 (operated by the time delay relay coil 38), normally open under voltage sensing contacts 50, normally closed over voltage contacts 52, a normally closed stop switch 54, and a start switch 56 that may be momentarily operated to close the start circuit through the start coil 32, which has its other side connected to the grounded side of the power transformer secondary.

Valve switch 44, which is mounted on the control valve 18, and connected by electrical leads to the control panel circuit, is in its illustrated position when the valve is closed. This completes the start circuit to energize the start relay 32. Energization of the start relay 32, operates its normally open latch contacts 32-1, which latch the coil to ensure its energization when the momentarily actuated start button is released. Power through the start circuit is also fed via electrical leads from the control panel to a pilot valve solenoid 60, which accordingly is energized upon operation of the start button 56. Energization of the pilot solenoid begins the relatively slow opening of the control valve 18.

Energization of the start coil 32, closes normally open contacts 32-2, to complete a run or maintain circuit from the power supply through contacts 32-2, and thence via the remainder of the start circuit previously described. The maintain circuit thus bypasses the valve switch 44, which will move to its valve open position (not illustrated) as the valve substantially obtains its open position.

Energization of start relay coil 32, also closes normally open contacts 32-3 to enable energization of the contactor relay control coil 36, which, when energized, closes normally open contacts 36-1. The closing of contacts 36-1, and the operation of valve switch 44 to its open position complete a run circuit that maintains energization of coil 36 as long as the valve remains in its open position, and even though the start circuit should be disabled.

Completion of the run circuit including the energization of the coil 36, closes normally open relay contacts 36-2, which complete the circuit for energization of contactor relay coil 34. Energization of the latter closes normally open relay contacts 34-2 to energize the run indicator light 40. Primarily, however, energization of the contactor coil 34, closes normally open contactors or motor switches 34-3, 34-4, and 34-5, which when closed, couple the induction generator 66, to the three phases 68, 70, 72 of the utility lines 20. Also connected to the utility lines 68, 70 and 72, are an under voltage sensor 74, and an over voltage sensor 76, which are connected to actuate respectively the under voltage switch 50 and the over voltage switch 52.

Upon initial start up the start circuit is energized through the valve switch 44 in its closed position. When start button 56 is momentarily pushed, relay contacts 32-4 are closed by energization of coil 32, to thereupon energize time delay relay coil 38. When the time delay of relay coil 38 times out (reaches the end of its delay period), it opens the time delay switch 48, to thereby disable the start and maintain circuits and disable the energization of coil 32. However, because the time delay coil 38 is energized through the valve switch in its closed position, if the valve opens so that the switch 44 moves from its closed position before the end of the delay period, the delay is disabled and the time delay switch 48 remains in the illustrated closed position. To prevent the time delay coil 38 from remaining energized via closed contacts 32-2 and 32-4 after valve switch 44 opens, the normally closed contacts 34-1 are connected to break the circuit between contacts 32-2 and 32-4 when contactor coil 34 is energized.

When the system is started, main generator contactors 34-3, 34-4, and 34-5, are closed (upon energization of coil 34), to provide power to the induction generator 66, which intially operates as a motor, drawing power from the utility lines. As the control valve begins to open and the turbine speed begins to increase, the induction generator speed also increases. When this speed goes above synchronous speed the generator no longer draws power but actually generates power which is then fed through the contactors 34-3, 34-4, and 34-5, to the utility line. Should there be a power failure in the utility line while the turbine generator is operating, all relays will be deenergized and all contacts will switch to deenergized position by virtue of the power failure. This will bring the control valve to closed position and thereby stop the unit. An under voltage condition, where the power grid voltage drops five to ten percent below normal, would damage the generator. Such under voltage is sensed by sensor 74 to open the switch contacts 50 (which close when grid power is normal), to deenergize the start coil 32 and to shut the system down.

When the maintain circuit is disabled, as by opening of any of the switches 46, 48, 50, 52, or by operation of the stop button 54, coil 32 is deenergized and the pilot valve solenoid 60 is also deenergized to initiate the relatively slow closing operation of the valve. However, the system must not be re-started after a power failure if the turbine is continuing to run at high speed because severe damage can result from coupling a load to the generator while it is running at high speed. Accordingly, the circuit is arranged so that after it has been shut down it cannot be restarted until the valve has regained its closed position. When the control valve is closed, of course, the turbine is not rotating. When valve switch 44 is in valve open position (not illustrated), the start circuit is disabled and thus the system cannot be restarted until the valve closes and valve switch 44 is in its valve closed position (illustrated).

Upon power failure and subsequent loss of load, the turbine immediately accelerates to approximately one and one half times its original speed. This acceleration is almost instantaneous and accompanied by a nearly instantaneous reduction in flow rate through the turbine. This sudden reduction in flow rate could generate considerable surge in a line supplying water to the turbine. Such a surge in the systems of FIGS. 1, 3, and 4 may be taken care of, for example, by the illustrated relief valve 26. Pressure reduction valve 14 also provides a bypass around the turbine when the turbine is not running.

Should the water pressure at the turbine input drop to a point at which the turbine and generator speed decrease such that the generator no longer generates electricity but instead becomes a user of electricity, it is desirable to shut down the system to avoid waste of electric power. Accordingly, a pressure sensor (schematically indicated in FIG. 1 as included in the control valve), is provided at the valve to effect opening of the normally closed pressure switch 46 when the sensed pressure drops below a predetermined value. Thus, the system will be shut down to avoid unnecessary waste of power that is drawn by the induction generator at low speeds. The over voltage switch 52 is provided to protect the generator and control system from an excessively high voltage that may occur in the utility lines. Upon occurrence of a high voltage condition, switch 52 opens under control of the high voltage sensor 76.

If deemed necessary or desirable, remotely controlled and/or automatically controlled operation (not shown) of the control panel and turbine generator system may be provided. This may be achieved by employing remotely controlled switching contacts in a circuit connected in parallel with the manual start and stop buttons 56, 54 so that, for example, the system may be operated under control of a reservoir float switch or the like.

Figure 3:
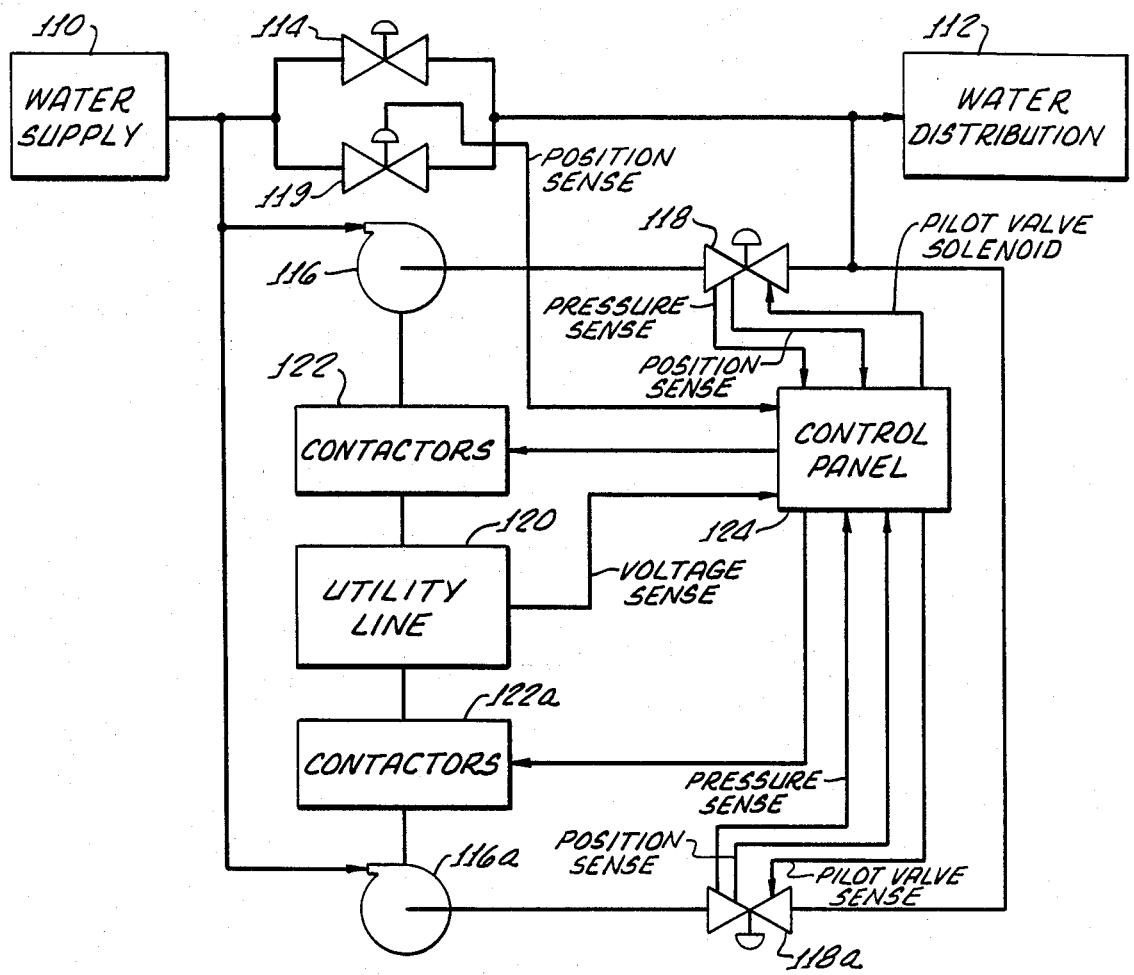
FIG. 3 illustrates a water supply system having plural turbine generators connected in parallel flow paths.

Illustrated in FIG. 3 is a system similar to that shown in FIG. 1, but specifically arranged for use with a water distribution system in which the flow rate undergoes relatively large repetitive variations. Such a user sytem, such as a city water distribution system, may have a very small rate of use at night, whereas at certain periods of the day the rate of water use may greatly increase. As depicted in FIG. 3, water is fed to a distribution system 112, through a pressure reducing valve 114 from a water supply 110. Just as previously described, a turbine generator 116 and control valve 118 are connected in a flow path in parallel with the pressure reducing valve 114. The generator is connected to a utility line 120, through a set of contactors 122 forming part of a control panel 124. Control panel 124 includes circuitry identical to that previously described in connection with control panel 24 of FIG. 1, receiving pressure signals and control valve position signals from the control valve and under and over voltage signals from the utility line, while feeding control signals to the control valve pilot valve solenoid and to the main utility line contactors. In this arrangement each of the turbine and generator has a size and capacity that is specifically selected to handle the expected minimum flow rate required by the distribution system 112 at maximum efficiency of both turbine and generator. Thus, during a significant period of minimum use, such as the nighttime hours, the chosen turbine and generator 116 and control valve 118, are sufficient to handle the desired or required flow and to provide the appropriate power generation at optimum operating efficiency.

In order to handle greater flow rates, those above the minimum rate for which the turbine generator 116 and valve 118 are designed and sized, a second turbine generator 116a and control valve 118a are connected in a flow path across the first combination of turbine generator and control valve. A pressure responsive bypass valve 119 is connected between the input of the turbine generator 116 and the output of valve 118, e.g. also in parallel with pressure reducing valve 114.

If the water flow rate (as drawn by the distribution system 112) increases above an amount established by a minimum flow rate setting of bypass valve 119, the latter starts to open and begins to bypass water around the turbine and control valve 116, 118. Bypass valve 119 opens further as flow rate increases. As the flow rate increases so as to open valve 119 by a predetermined amount to a predetermined setting, a microswitch (not shown) on the bypass valve stem is actuated to provide a position sense signal that is fed to control panel 124 to open the second control valve 118a, which thus starts the second turbine generator 116a.

As control valve 118a opens, bypass valve 119 closes down and the flow is directed through the two turbine generator units. If the pressure again increases above the setting of valve 119 it progressively opens again until flow rate now reaches the capacity for a third turbine generator unit. The microswitch on the valve stem now again closes, starting a third parallel turbine generator unit (not shown). The electrical control circuit for starting and stopping additional units may be controlled through a stepping relay (not shown) actuated by the microswitch on the valve stem of the bypass valve 119. Accordingly, if three or more parallel turbine generator units are employed, each time the flow rate increases to the setting of valve 119, regardless of the number of turbine generator units already operating, the control valve of the next (not yet operating) unit is opened to start operation of still another turbine generator. The second (or other) turbine generator and control valve 116a and 118a are operated from a duplicate set of circuits, identical to those described in connection with FIG. 2, and contained in the dual control panel 124. Accordingly, the latter receives signals of under and over voltage from the utility line and a pressure sense signal and valve position signal from the second (or other) control valve 118a, and will send out control signals to operate the pilot valve solenoid of the second (or other) control valve 118a and to operate contactors 122a (and other contactors) that connect the utility line to the generator of the second (or other) turbine generators 116a.

As previously mentioned, the turbine generator employed in the systems of FIGS. 1 and 3, may be one of many well-known types and may include either an induction type generator or a synchronous generator. Where electricity is to be generated and supplied to an existing power grid, the described induction generator is preferred for a number of reasons, including its relatively simple control which does not require frequency or phase synchronization. For some systems designed to supply electricity to a specific electrical load, such as motors, lighting, or other electrical appliances, there may be no existing power grid to supply excitation of an induction generator. Moreover, there is no need to provide precision synchronization of phase and frequency of the generated electricity. Nevertheless, some frequency control of generated power is required for compatibility with many electrical devices. Because the synchronous generator provides an output having a frequency that depends upon the rotational speed of the generator, it is necessary to control the turbine speed, within certain limits, so that the electrical power output frequency of the synchronous generator will not vary beyond limits acceptable to the load devices. According to one feature of the present invention, the turbine generator system of the type previously described in connection with FIGS. 1 and 2 may employ a synchronous generator and controls that provide a relatively fixed, stable turbine speed so as to provide an electrical output from the synchronous generator having a relatively stable frequency.

Figure 4:
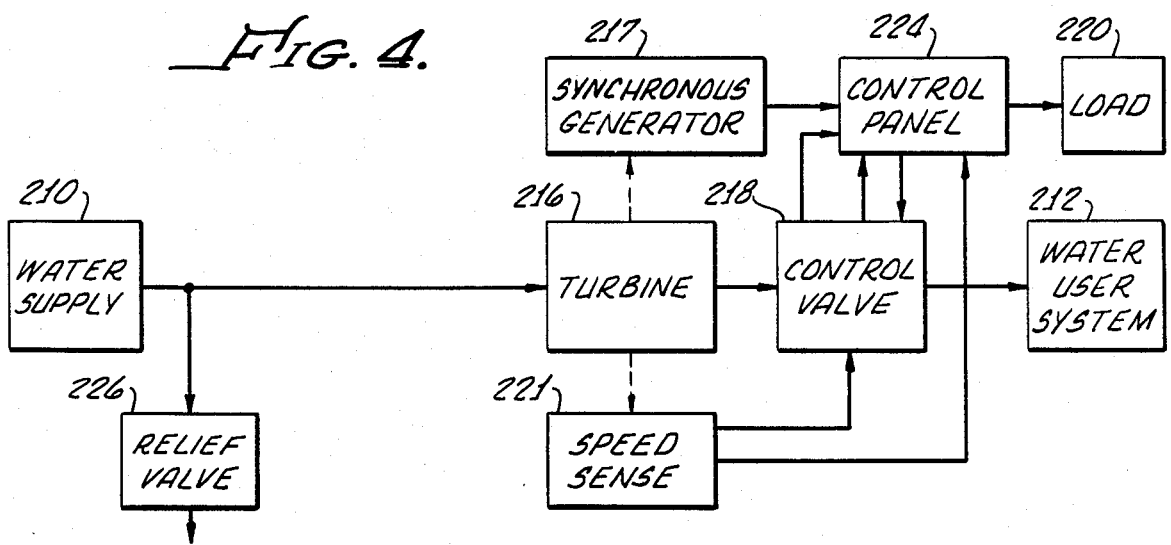
FIG. 4 illustrates a system embodying a turbine generator having a synchronous type generator.

As illustrated in FIG. 4, water from a supply source 210 is caused to flow to a water user system 212 through a turbine 216 and a control valve 218. The turbine 216 drives a synchronous generator 217 which is coupled with a control panel 224 that feeds power to an electrical load 220. The control panel may be substantially the same as that described in connection with the systems of FIGS. 1 and 3 and shown in FIG. 2, receiving pressure and valve position signals from the control valve and generating control signals to operate the control pilot valve solenoid and contactors (in the control panel) which connect the synchronous generator to the load. If deemed necessary or desirable the control panel circuitry may be modified to include a turbine speed sensor to control the synchronous generator contactors, so that the latter will not be connected to the load until the turbine speed has reached its selected speed range. An adequate degree of control of output frequency may also be achieved by sensing electric output frequency rather than turbine speed. In the arrangement illustrated in FIG. 4, a turbine speed sensing device 221 is employed to control the amount of opening of the control valve 218. Accordingly, an electrical signal from the speed sensor 221, will modulate the valve 218, varying the degree of opening of this valve, so as to vary the flow rate through the turbine and will maintain such flow rate within a predetermined relatively small range of variation. As in the prior systems, a relief valve 226 is connected at the input to the system to flow water to waste or atmosphere, should the flow rate and pressure rise to a value beyond the capacity of the turbine generator system.

The turbine speed will vary both with flow rate and with electrical load. For example, as increased load is applied to the generator output, turbine speed decreases to decrease the flow rate through the turbine. This decrease in speed is sensed by the speed sensor and applied to cause the flow rate control valve to open further to thereby bring the turbine speed back to its nominal value. The bypass or relief valves will protect against surges in the supply line.

Alternatively, an hydraulically controlled rate of flow control valve may be used in conjunction with control valve 218 thus eliminating the need for speed sensor 221. In this arrangement differential pressure across an orifice plate is sensed to modulate the control valve opening so as to maintain constant flow rate.

Figure 5:
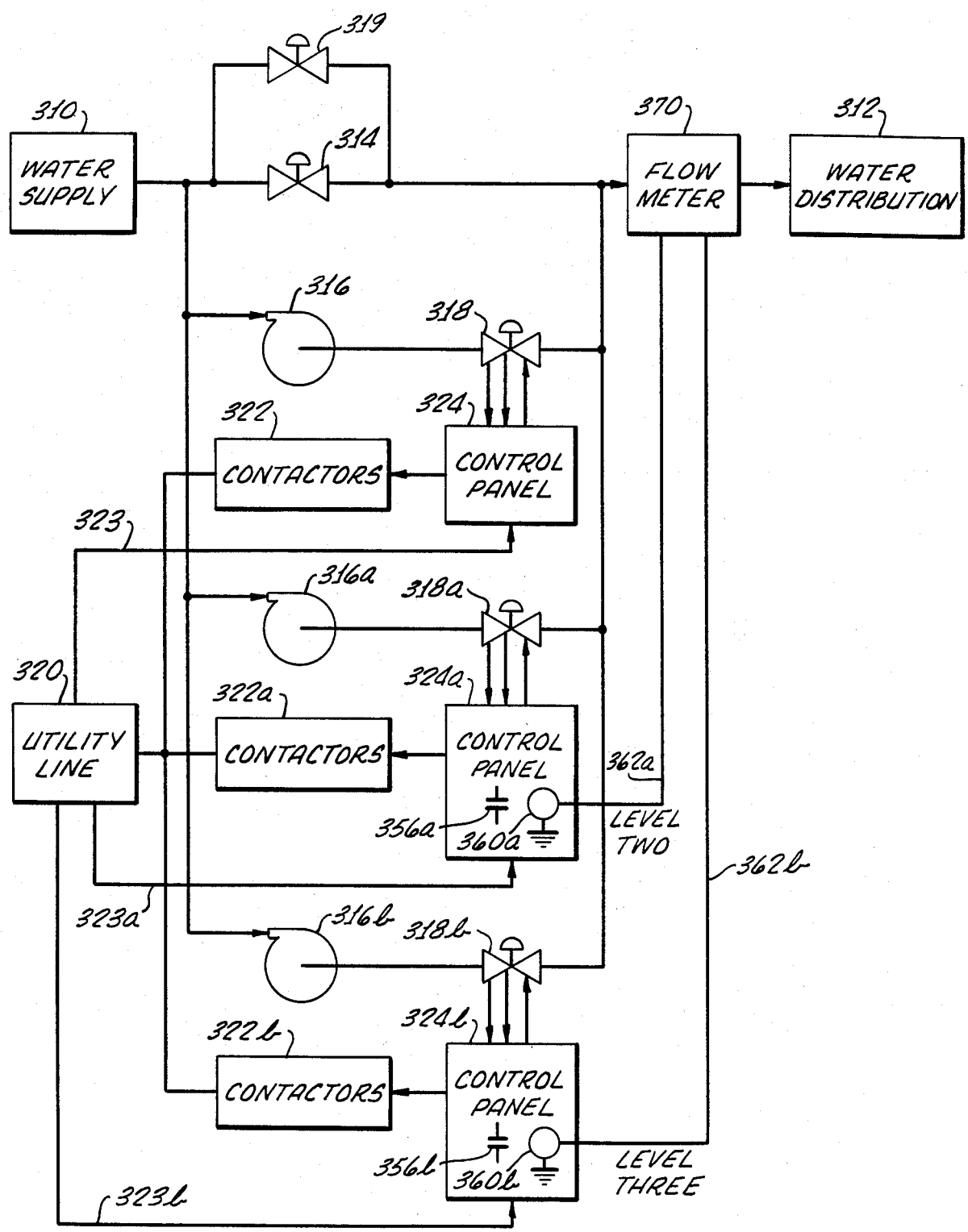
FIG. 5 illustrates a water supply having a modified arrangement of turbine generators connected in parallel flow paths.

Illustrated in FIG. 5 is a modification of the arrangement of FIG. 3 which is particularly useful for a water distribution system in which the flow rate undergoes relatively large repetitive variations. Water is fed to a distribution system 312 through a pressure reducing valve 314 from a water supply 310 and, as previously described, a turbine generator 316 and a control valve 318 are connected in a flow path in parallel with pressure reducing valve 114. Similarly, a bypass valve 319 is connected in parallel with the pressure reducing valve. Just as in the arrangement of FIG. 3, second and third combinations of turbine generator 316a and control valve 318a and turbine generator 316b and control valve 316b (and additional ones if necessary) are likewise connected in parallel with each other and with the pressure reduction and bypass valves 314 and 319. Each combination of turbine generator and control valve is under control of circuitry contained in a control panel 324, 324a and 324b, respectively, each of which is interconnected with the utility line 320 via respective contactors 322, 322a and 322b and via voltage sensing lines 323, 323a, 323b. Control panel 324 is identical to the panel previously described and illustrated in FIG. 2 and operates in combination with the turbine generator 316 and control valve 318 just as previously described. Each of control panels 324a and 324b is nearly identical to the previously described control panel but each of these has the start button, designated at 56 in FIG. 2, replaced by a set of contacts 356a and 356b, respectively, for the two control panels. The contacts 356a and 356b are normally open and are actuated to closed condition by energization of relay coils 360a and 360b, respectively, each of which is energized by the occurance of a signal on a respective one of the leads 362a and 362b, respectively, which are coupled to the output of a flow meter 370. Flow meter 370 is connected to the flow line to the water distribution system 312 downstream of the connection of the other components of the system to the main flow line. Thus, the flow meter will, at all times, measure flow rate of the total amount of water drawn by the water distribution system. The flow meter includes circuitry (not shown) that provides an output electrical signal on line 362a when the second flow rate exceeds a selected level, designated as level two and will provide a signal on its second output line 362b when the flow rate exceeds a rate which may be designated as level three.

As previously described, the first turbine generator 316 has a size and capacity specifically selected to handle the expected minimum flow rate required by the distribution system 312 at maximum efficiency of both turbine and generator. This minimum flow rate may be designated as level one. The flow rate designated as level two is greater than the flow rate of level one by an amount that is substantially equal to the flow rate required for optimum operation of the second turbine generator 316a. Similarly, the flow rate designated as level three exceeds the flow rate of level two by an amount substantially equal to the minimum flow rate required for most efficient operation of the turbine generator 316b. Preferably, each of the parallel flow paths through the respective turbines is provided with a suitable arrangement to maintain a substantially constant flow rate through the turbine. Thus, each control valve may be employed with an hydraulically controlled rate of flow valve, as described above in connection with FIG. 4, to maintain a substantially constant flow rate and optimum efficiency of turbine and generator.

Operation of the system of FIG. 5 at minimum flow rate is just as previously described. Turbine generator 316 is started by operating the start button 56 of its control panel 324 and, assuming existence of the minimum flow rate, flow from the water supply to the water distribution goes through the turbine generator 316, through the control valve 318, and thence past the flow meter to the distribution system. As water usage increases above the minimum, bypass valve 319 begins to open and initially this increase in flow rate above the minimum rate flows through the bypass valve and past the flow meter to the water distribution system. As the flow rate increases, greater amounts of water are passed through the bypass valve 319 until a total flow of water through the flow meter (from the water flowing through the turbine generator 316 and through the bypass valve 319 and through the pressure reduction valve 314, if any,) reaches the magnitude defined as level two. When this level of flow rate is reached, there is sufficient flow bypassing the turbine 316, via the bypass valve 319, to operate the second turbine generator 316a at optimum efficiency. With such a level two flow rate, the flow meter 370 provides a signal on line 362a which energizes relay coil 360a to thereby close the start contacts 356a of control panel 324a, thus initiating operation of the second turbine generator unit and commencing opening of the second control valve 318a.

Should water drawn by the distribution system 312 increase above level two, to the third pre-selected level, the flow meter produces an output signal on line 362b which energizes start relay coil 360b of the third control panel 324b to close the normally open contacts 356b and thus start operation of the third turbine generator unit. It will be readily appreciated that additional paralleled turbine generator units with control valves and control panels may be readily combined with the arrangement illustrated in FIG. 5 so as to handle greater ranges to flow rate variation or to handle flow rate variations with different magnitudes of flow rate change from one level to the next. When the flow rate decreases below one of the higher levels, the corresponding output signal of the flow meter 370 ceases, thereby deenergizing the corresponding one of relay coils 360a or 360b to open the control circuit of the control panel and thus shut down the corresponding turbine generator and control valve.

It will be seen that methods and apparatus have been described for employing wasted energy of water flow for generation of electricity in systems that control the turbine generator for optimum operation without damage to the existing water systems, but using standard, off-the-shelf pumps or turbines. A wide variety of sizes is readily available for use in many different conditions of pressure and flow. A submersible or wet type turbine generator may be employed and installed directly inside the pipeline to provide a system that is less subject to vandalism and environmental elements.

The foregoing detailed description is to be clearly understood as given by way of illustration and example only, the spirit and scope of this invention being limited solely by the appended claims.

What is claimed is:

1. In combination with a water system in which water flows from a supply at relatively high pressure to a water receiving system at relatively low pressure, a controlled power generating system comprising
  a turbine connected in a flow path between said supply and receiving system,
  an electrical generator connected to be driven by said turbine,
  a control valve operable between closed and open positions for controlling flow through said turbine,
  contactor means operable between closed and open conditions for coupling said generator to a power circuit, start means for operating said contactor means to closed condition and for initiating operation of said control valve to open position, and means responsive to said valve for disabling said start means when said control valve is in said open position.

2. The apparatus of claim 1 including means responsive to water pressure at said control valve below a predetermined value for disabling said start means, for operating said contactor means to open condition, and for operating said control valve to closed position.

3. The apparatus of claim 2 wherein said start means includes maintaining circuit means for maintaining said contactor means in closed condition and for maintaining said valve in open position, said contactor means including a contactor relay and a contactor control relay for controlling energization of said contactor relay, said maintaining circuit including means and said valve responsive means for controlling energization of said contactor control relay.

4. The apparatus of claim 3 including means for initiating said start means, time delay means for disabling said maintaining circuit means at a predetermined time after initiating said start means, and means for disabling said time delay means when said valve is in open position, said contactor means having a normally open condition, whereby said contactor means will be in open condition when said maintaining circuit means is disabled after said predetermined time unless said valve is in open position to disable said time delay means.

5. The apparatus of claim 3, including pressure sensitive control means for sensing pressure at said valve and disabling said start means (32) to initiate opening of said valve so as to de-energize said contactor control relay (36) to open said contactor means and disconnect the generator from said power circuit.

6. The apparatus of claim 1 wherein said start means includes maintaining circuit means for holding said valve in open position, said valve including a remote control for operating the valve, said maintaining circuit means including means for controlling energization of said remote control.

7. The apparatus of claim 1 wherein said generator is a synchronous generator and including means for stabilizing the rotational speed of said turbine.

8. The apparatus of claim 7 wherein said means for stabilizing comprises means for maintaining a constant flow rate through said control valve.

9. The apparatus of claim 1 wherein the rate of flow of water to said water receiving system varies from a minimum flow rate, and including a second turbine and generator and control valve connected between said supply and receiving system, said first mentioned turbine and generator being sized to handle said minimum flow rate, and means for initiating the opening of said second control valve to flow water through said second turbine when flow rate to said receiving system rises above said minimum flow rate.

10. The apparatus of claim 1 wherein the rate of flow of water to said water receiving system varies from a minimum flow rate, and including a second turbine and generator and control valve connected between said supply and receiving system, a control circuit including second start means for initiating operation of said second control valve to open position, said first mentioned turbine and generator being sized to handle said minimum flow rate, a bypass valve connected in parallel with said first and second turbines and generators and control valves, a flow meter connected to sense rate of flow of water to said water receiving system at a point downstream of said turbines, generators, and valves, said flow meter including means for generating a start signal when flow rate at said downstream point exceeds said minimum flow rate by a predetermined amount, and means responsive to said start signal for operating said second start means.

11. A water turbine generating system comprising,
a turbine having an input connected to a source of water supply and an output connected to a distribution system,
a generator connected to be driven by the turbine,
a set of generator contactors for connecting the generator to an electrical load,
a control valve connected in the flow path of said turbine to control flow of water through the turbine, and,
control means for operating the control valve and the contactors, said control means comprising
a start circuit having a start relay coil (32) and a plurality of contacts connected to be operated thereby, the start circuit including a valve position switch (44) for energizing said start relay coil,
a switch operator on said control valve for driving said valve switch to open and closed positions respectively as the valve moves to open and closed positions,
a contactor control relay having a relay coil (36) and a plurality of relay contacts connected to be operated thereby, one of said start relay coil contacts (32-3) being connected in circuit with said control relay coil,
a control circuit, including a first one of said control relay contacts (36-1) and including said valve switch in open position for energizing said control relay coil (36) and for maintaining energization thereof,
a maintain circuit independent of said valve position switch and including a second set of said start relay coil contacts (32-2) for maintaining energization of said start relay coil (32),
a pilot valve solenoid (60) connected in said maintain circuit for opening said control valve, and
a motor contactor circuit having one of said control relay coil contacts (36-2) connected therein and including a generator contactor coil (34) for operating said generator contactors (34-2, 34-3, 34-4) to connect the generator to a user electrical system.

12. The apparatus of claim 11, including a time delay circuit having a time delay coil (38) and a set of contacts (48) connected to be operated thereby connected in said maintain circuit, a third set of contacts (32-4) of said start relay coil (32) and said valve position switch (44) being connected in circuit with said time delay coil.

13. The system of claim 12, including a normally closed set of contacts (34-1) connected to be operated by said contactor coil (34) and connected to said time delay coil to prevent energization of the time delay coil when the contactor coil (34) is energized.

14. The system of claim 13 including a pressure switch (46) connected in said maintain circuit and means for sensing pressure at said control valve for opening said pressure switch to disable the maintain circuit in response to pressure at said control valve below a predetermined minimum value.

15. The method of generating electricity comprising the steps of
connecting a turbine in the flow path of water flowing from a water supply to a water user system,
connecting a generator to be driven by the turbine,
connecting the generator to a power circuit,
connecting a control valve to control flow of water through the turbine,
connecting a relief valve to flow water past the turbine when water pressure exceeds a predetermined value,
starting turbine and generator operation by initiating opening of the control valve and connecting the generator to an electrical load, and
preventing starting of said turbine and generator and disabling said connection of said generator and power circuit when said control valve is open.

16. The method of claim 15, including the step of initiating a time delay period when said turbine and generator are started, and shutting down the turbine and generator at the end of the time delay period if the control valve is not open.

17. The method of claim 15 wherein the flow rate of water to the user system varies from a predetermined minimum rate and wherein said turbine and generator are formed with a capacity to most efficiently handle said minimum rate, and including the steps of connecting a second turbine in parallel with the first turbine between said water source and water user system, connecting a second generator to be driven by said second turbine, connecting a second control valve in the flow path of said second turbine, and directing flow from said source to said second turbine when the flow rate to said first turbine exceeds said minimum rate.

18. The method of claim 17 including the step of diverting water flowing to said first turbine from said source when the pressure at said first turbine exceeds a predetermined minimum value.

19. The method of claim 15 including the step of shutting down the turbine generator when the impedance of said power circuit goes beyond a predetermined range of values.

20. The method of claim 15 wherein the generator is an induction generator and including the step of stopping the turbine and generator when the pressure at the turbine is not sufficient to cause the generator to be driven above a predetermined speed.

21. The method of claim 15 wherein the generator is a synchronous generator, the speed of said turbine and generator varying as the magnitude of said load varies, and including the steps of controlling the rate of flow of water to said turbine in response to variation of turbine speed so as to decrease variation of turbine speed.

22. The method of claim 15 including the steps of connecting said turbine in parallel with a pressure reducing station that is connected between said supply and said water user system.

23. In combination with a water system in which water flows from a water supply at relatively high pressure to a water receiving system at relatively low pressure, a controlled power generating system comprising
a first turbine generator and a first control valve connected in a flow path between said supply and a junction point connected to feed said receiving system, said turbine generator being sized for handling a predetermined minimum flow rate at optimum efficiency,
a bypass valve connected in a second flow path between said water supply and said junction point,
a second turbine generator and a second control valve connected in a third flow path parallel with said first and second paths between said water supply and said junction point,
a flow meter connected to sense flow to said water receiving system at a point downstream of said junction point, said flow meter including means for generating a start signal in response to measured flow that exceeds said predetermined minimum by a first amount,
means (356a) responsive to said start signal for opening said second control valve and starting operation of said second turbine generator,
a first control circuit for operating said first turbine generator and control valve,
a second control circuit for operating said second turbine generator and control valve, and
first and second contactor means operable between closed and open conditions for respectively coupling said first and second generators to a power circuit,
each said control circuit including start circuit means for operating the corresponding contactor means to closed condition and for initiating operation of the corresponding control valve to open position, and each said control circuit including means responsive to its corresponding valve for disabling the start circuit means when the control valve is in its open position, said means (356a) responsive to the start signal comprising means for initiating operation of said start circuit means of said second control circuit.

* * * * *